United States Patent Office 2,963,330
Patented Dec. 6, 1960

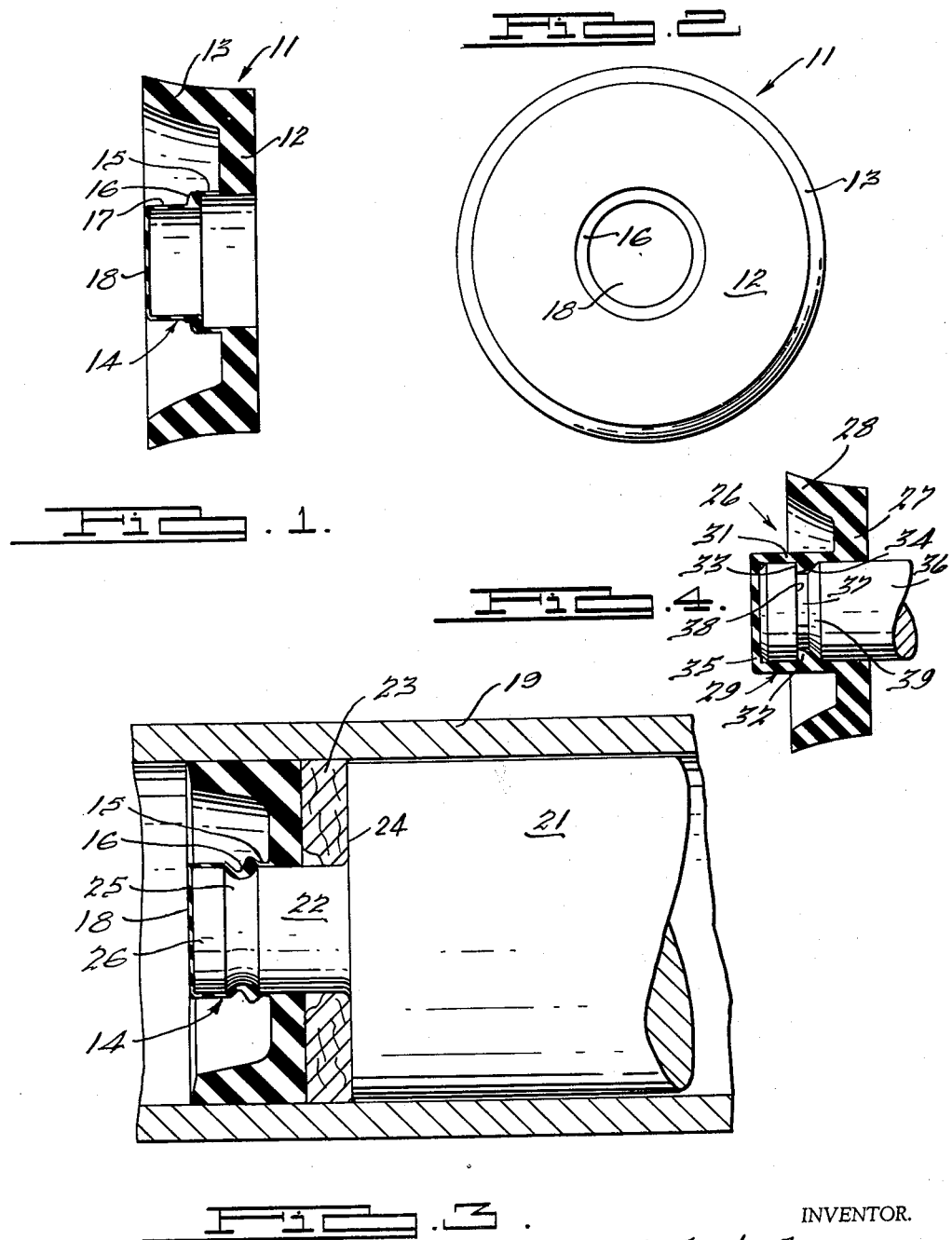

2,963,330

PACKING FOR JACK PISTON

Lyle L. Arnes, Racine, Wis., assignor, by mesne assignments, to Walker Manufacturing Company, Racine, Wis., a corporation of Delaware Filed Oct. 8, 1958, Ser. No. 765,997

8 Claims. (Cl. 309—23)

This invention relates to jacks and similar devices, and particularly to the construction of rams or pump pistons in such mechanisms.

It is an object of the invention to provide a novel and improved construction for the packing or sealing means which are necessary at that end of a ram or pump piston which faces the hydraulic fluid, which will eliminate the need for extraneous fastening devices or adhesives between the packing or sealing means and the main portion of the ram or piston.

It is another object to provide an improved packing construction of this nature which permits assembly of the packing element with the piston without the use of tools of any kind, thus materially reducing the manufacturing cost and assembly time of hydraulic devices.

It is also an object to provide an improved packing construction of the above character which is of relatively simple construction and may be fabricated using conventional materials.

Other objects, features, and advantages of the present invention will become apparent from the subsequent description, taken in conjunction with the accompanying drawings.

In the drawings:

Figure 1 is a cross-sectional view of a packing member constructed according to the principles of the invention, the packing member being shown in its undeformed condition;

Figure 2 is an end view of the packing member;

Figure 3 is a cross-sectional view of a portion of a cylinder showing a piston with the packing member mounted at one end thereof; and Figure 4 is a cross-sectional view of a modified form of the packing member which incorporates a different type of attaching portion.

In general terms, the invention comprises a packing member of rubber or similar material having a central recess, and a stem at one end of the piston over which the packing member recess is adapted to be placed. The recess is formed by two relatively thin annular sections between which is disposed an inwardly protruding relatively thick section. The piston stem has an annular groove, and the configuration of the parts is such that the thick inwardly protruding section on the packing member may be snapped into the groove on the piston stem. The packing will be retained on the stem by the combined gripping and squeezing action of the thickened annular section and a suction action which will be created by one of the thin sections with respect to the piston stem.

Referring more particularly to the drawings, one embodiment of the packing member is generally indicated at 11 and is shown in Figure 1 in its undeformed condition.

Packing member 11 is of circular shape, as seen in Figure 2, and may be fabricated of synthetic or natural rubber, or any similar flexible material having sealing properties. The packing member comprises a main portion 12 extending in a generally radial direction, and an outer sealing lip 13 which extends in one direction from the periphery of portion 12. Sealing lip 13, in its undeformed condition, may have a somewhat flared configuration, as seen in Figure 1.

A recessed portion 14 is formed at the center of main portion 12 of the packing member. This recessed portion comprises a relatively thin annular wall 15 contiguous with section 12 and extending axially in the same direction as sealing lip 13. A thickened annular section 16 is contiguous with section 15, as seen in Figure 1, and a thin-walled section 17 extends axially from thickened section 16. The diameter of section 15 is somewhat larger than that of section 17, thickened section 16 extending between these two diameters. The outer end of section 17 is closed by a thin-walled section 18. It should be noted that the thicknesses of section 12 and sealing lip 13 are substantially greater than the thicknesses of sections 15, 16, 17 and 18. Preferably, section 18 is approximately in the same plane as the outer edge of sealing lip 13.

Figure 3 shows a portion of a cylinder 19 together with one end of a piston 21 on which is formed a stem 22 for the reception of packing member 11. Stem 22 has a main diameter which is substantially equal to the diameter of thin section 15 on packing member 11, this diameter likewise being the inner diameter of annular section 12. The length of stem 22 is such that it will be accommodated by the depth of the recess formed in the packing member, taking into account a backup disk 23 formed of leather or similar material which may be disposed between packing member 11 and the end surface 24 of the piston. A groove 25 is formed at an intermediate portion of stem 22, the position of this groove being such that when end surface 26 of the stem engages thin-walled section 18 of the packing member, groove 25 will be aligned with thickened section 16 of the packing member. Groove 25 is preferably of such shape that thickened section 16 of the packing member may be securely retained therein.

In assembling the packing member on the piston, after backup disk 23 has been placed on piston stem 22, recess 14 of the packing member will be forced over the piston stem, the piston at this time being of course removed from cylinder 19. The stem will enter the larger diameter portion of the recess until it engages thickened section 16. Further forcing of the packing member onto the stem will cause thickened section 16 to be expanded until it slips over the outer end of stem 22 and snaps into groove 25. During this movement, thin-walled section 15 will have a hinge type of action which will permit section 16 to be more easily expanded over the piston stem. As section 16 snaps into position in groove 25, thin walled section 17 will stretch over the outer end of the piston stem, so that sections 17 and 18 will fit snugly over the stem end. The piston and packing member may then be placed within cylinder 19, sealing lip 13 of the packing member being compressed into the position shown in Figure 3.

Our assignee's copending application, Serial No. 604,142, filed August 15, 1956, shows a jack unit having a ram wherein the present packing may be substituted for element 34 thereof. Thus liquid pressure will be on the left of the member 11 and will tend to hold it tightly against the cylinder wall and on the stem 22, the operating stroke of the ram 21 being to the right in Fig. 3 as fluid is pumped against the end of the ram.

During operation, reciprocation of piston 21 may be accomplished without any loosening of packing member 11 on the piston stem. The packing member will be retained on the stem by fluid pressure and the contractive action of thickened section 16 on stem groove 25. Moreover, the snug relationship between sections 17 and 18 of the packing member and the adjacent surfaces of stem 22, together with the tight position of section 16 on the stem, and the compressive effect of hydraulic pressure on cup section 14 will prevent the admission of air or fluid between these flush surfaces, thus creating a suction type of action which will contribute to the retention of packing member 11 on the piston stem.

Figure 4 shows a modified form of the packing member which is generally indicated at 26. The packing member is similar in its construction to that shown in Figures 1-3, but has an attaching portion which is somewhat differently constructed. More particularly, the packing member has a main portion 27 extending in a generally radially direction, and an outer sealing lip 28. A recessed portion generally indicated at 29 is formed at the center of main portion 27 of the packing member, and comprises a relatively thin annular wall 31. An intermediate portion of the inner surface of recessed portion 31 has an annular ridge 32 formed thereon. This ridge is of saw-toothed cross-section, having a radial surface 33 on the outer end thereof and an inclined surface 34 on the inner end. Unlike the embodiment of Figures 1-3, the inner diameter of recessed portion 31 is the same on both sides of ridge 32, and the outer end of section 31 is closed by a thin wall section 35.

Packing member 26 is adapted to be mounted on a stem 36 extending from a piston (not shown) in a manner similar to that described with respect to the previous embodiment. Preferably, stem 36 is provided with an annular groove 37 having a radial surface 38 at the outer end thereof and an inclined surface 39 at the inner end. The inner diameter of recessed packing member portion 29 is, as in the previous embodiment, slightly less than the diameter of stem 36.

With this construction, it will be seen that packing member 26 may be forced onto stem 36, ridge 32 snapping into position within groove 37. As in the previous embodiment, the packing member will be retained on the stem by the combined action of fluid pressure, the contractive forces of recessed portion 29, and the position of ridge 32 within groove 37.

It should be observed that packing member 26, as well as packing member 11 of Figures 1-3, may be fabricated by conventional molding operations. In the case of member 26, the flexibility of the rubber will permit withdrawal of the core past ridge 32.

It will thus be seen that a packing member construction is provided which requires no tools, fastening means or adhesive materials to assemble or retain the packing member on the piston. It is of simple construction, comprising inner and outer integral, oppositely facing cup sections which can be easily formed of elastic material such as rubber. Since packing member section 18 or 35 of Figure 4, in cooperation with its contiguous sections, completely covers the outer end of the piston stem, sealing lip 13 (or 28) will be the only portion of the packing member which will be required to maintain a sealing relation with another part of the assembly in direct contact with the hydraulic fluid.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a packing construction for a hydraulic piston, a stem at one end of the piston, a groove at an intermediate portion of said stem, a unitary packing member of flexible material having an annular radially extending main portion, an annular sealing lip formed at the periphery of said main portion, a recessed portion extending axially from the inner edge of said main portion and surrounding said stem, said recessed portion comprising two thin-walled sections joined by a relatively thick section disposed within said groove, said thick section having a smaller diameter than said groove when in its undistorted condition, and a radially extending thin-walled section closing the outer end of said recessed portion.

2. In a packing construction for a piston, a stem at one end of said piston, said stem having a constant diameter and an annular groove at an intermediate portion thereof, a unitary packing member of flexible material comprising a main radially extending portion, an annular sealing lip at the periphery of said main portion, a recessed portion extending axially from the inner end of said main portion and adapted to surround said stem, said recessed portion having a first thin-walled section contiguous with said main portion, an annular thickened portion contiguous with said thin-walled portion and disposed within said groove, the inner diameter of said thickened portion being less than that of said thin-walled portion and stretchably disposable within said groove, a second thin-walled portion contiguous with said thickened portion and having said lesser diameter, and a radial portion closing the end of said second thin-walled portion.

3. The combination according to claim 2, said first thin-walled section having approximately the same diameter as said stem, said second thin-walled section being stretchably disposable on the outer end of said stem when said thickened portion is disposed within said groove.

4. In a fluid device having a pressure cylinder, a piston working in said cylinder and having an end subject to fluid pressure, a rubber packing having a heavy outer section engaging the wall of said cylinder, said packing having a thinner inner cup-shaped section, and a projection on said piston fitting in said cup-shaped section, said cup shaped section being of smaller diameter than said projection and radially and elastically expanded in fitting on said projection, said packing comprising inner and outer oppositely facing cup-shaped sections which are axial and coextensive.

5. The invention set forth in claim 4 wherein said inner cup-shaped section has portions of different diameter.

6. The invention set forth in claim 4 wherein said different diameter portions of said inner cup-shaped section are joined by a heavier section adapted to fit in a groove on said projection.

7. In a packing construction for a hydraulic piston, a stem at one end of the piston, a groove at an intermediate portion of said stem, said groove having a radial wall at its outer end, a unitary member of flexible material having an annular radially extending main portion, an annular sealing lip formed at the periphery of said main portion, a thin-walled recessed portion extending axially from the inner edge of said main portion and surrounding said stem, an annular ridge at an intermediate portion of the inner surface of said recessed portion and disposed within said groove, said ridge having a radial surface engageable with the radial surface of said groove, and a wall section on said packing member closing the outer end of said recessed portion, the inner diameter of said recessed portion being less than the diameter of said stem.

8. In a packing construction for a hydraulic piston, a stem at one end of the piston, a groove at an intermediate portion of said stem, said groove having a radial wall at its outer end and an inclined surface at its inner end, a unitary member of flexible material having an annular radially extending main portion, an annular sealing lip formed at the periphery of said main portion, a thin-walled recessed portion of less diameter than said stem extending axially from the inner edge of said main portion and stretched over said stem, an annular ridge at an intermediate portion of the inner surface of said recessed portion and disposed within said groove, said ridge having a radial surface engageable with the radial surface of said groove and an inclined surface at its inner end, and a wall section on said packing member closing the outer end of said recessed portion.

References Cited in the file of this patent

UNITED STATES PATENTS

| | | |
|---|---|---|
| 2,509,436 | Isenbarger | May 30, 1950 |
| 2,571,486 | Reynolds | Oct. 16, 1951 |
| 2,726,124 | Boyce | Dec. 6, 1955 |
| 2,840,428 | Browall | June 24, 1958 |